United States Patent [19]
Kern

[11] Patent Number: 6,126,221
[45] Date of Patent: Oct. 3, 2000

[54] UNIVERSAL GARAGE DOOR OPENER OVERHEAD COMPARTMENT

[75] Inventor: Martin R. Kern, Madison Heights, Mich.

[73] Assignee: Sidler Incorporated, Madison Heights, Mich.

[21] Appl. No.: 09/276,320

[22] Filed: Mar. 24, 1999

Related U.S. Application Data

[60] Provisional application No. 60/079,158, Mar. 24, 1998.

[51] Int. Cl.$^7$ .................................................. B60R 5/00
[52] U.S. Cl. ........................................ 296/37.7; 296/37.8
[58] Field of Search ................................. 296/37.8, 37.7; 224/282, 311, 312; 200/61.62; 340/825.69; 455/99

[56] References Cited

U.S. PATENT DOCUMENTS

| | | | |
|---|---|---|---|
| 3,849,615 | 11/1974 | Fisher ..................................... | 200/61.81 |
| 4,241,870 | 12/1980 | Marcus .................................... | 296/37.7 |
| 4,595,228 | 6/1986 | Chu ........................................ | 296/37.7 |
| 4,867,498 | 9/1989 | Delphia et al. ......................... | 296/37.7 |
| 5,064,974 | 11/1991 | Vigneau et al. ....................... | 200/61.62 |
| 5,388,880 | 2/1995 | Kinane .................................... | 296/37.7 |
| 5,522,638 | 6/1996 | Falcoff et al. .......................... | 296/37.8 |
| 5,636,891 | 6/1997 | Van Order et al. .................... | 296/37.7 |
| 5,887,929 | 12/1999 | Miller et al. ........................ | 296/37.7 X |
| 6,003,925 | 12/1999 | Litke et al. ............................. | 296/37.8 |

FOREIGN PATENT DOCUMENTS

| | | | |
|---|---|---|---|
| 10-076881 | 3/1998 | Japan ............................... | B60R 7/04 |

*Primary Examiner*—Joseph D. Pape
*Attorney, Agent, or Firm*—Rohm & Monsanto, P.L.C.

[57] ABSTRACT

An overhead console arrangement for a motor vehicle is provided with a compartment that will accommodate therein any of a multiplicity of known garage door openers, and permit same to be actuated by application of an actuation pressure to the door of the compartment. The door of the compartment is provided with a resilient latching arrangement that precludes inadvertent opening of the door, yet permits inward displacement thereof to effect actuation of the garage door opener. The housing of the compartment preferably is integrally formed with structure for supporting a plurality of electrical elements that function independently of the garage door opener. These include switching elements for the sunroof of the vehicle and interior lighting, as well as a lighting enclosure. Actuation of the garage door opener transmitter, which is coupled to the door of the compartment, is effected by urging the door further in the closed direction, whereupon an actuator coupled to the roof of the compartment communicates with the actuation region of the garage door opener transmitter.

19 Claims, 5 Drawing Sheets

UNIVERSAL GARAGE DOOR OPENER OVERHEAD COMPARTMENT

RELATIONSHIP TO OTHER APPLICATION

This application claims the benefit of U.S. Provisional application No. 60/079,158 filed Mar. 24, 1998.

BACKGROUND OF THE INVENTION

1. Field of the Invention

This invention relates generally to storage compartments for garage door openers, and more particularly, to an openable compartment for storing and actuating any of a variety of garage door opener arrangements, actuation being effected without requiring the compartment to be opened.

2. Description of the Related Art

Conventional electronic garage door opener transmitter compartments of the type that are used in overhead consoles of vehicles, particularly motor vehicles, suffer from a number of disadvantages. In one type of such compartments, the electronic garage door opener transmitter is secured to the roof of the compartment, by an adhesive that may include conventional hook-and-loop fastener patches (e.g., Velcro® fastener). The hook-and-loop fastener patches are each adhesively coupled to the electronic garage door opener transmitter and the roof (ceiling) of the compartment. Often times, however, the motion of the vehicle will dislodge the electronic garage door opener transmitter whereby it becomes loosened from the roof. Then, when the compartment door is opened, the electronic garage door opener transmitter falls out of the compartment, perhaps becoming damaged. There is a need, therefore, for an arrangement for storing the electronic garage door opener transmitter in a conveniently accessible location, without permitting same to be dropped inadvertently.

In addition to storage, there is a need for an arrangement wherein the electronic garage door opener transmitter can be actuated without it being removed from the compartment, and without requiring direct access thereto or communication therewith by the operator. Prior art arrangements that have endeavored to obviate the need to remove the electronic garage door opener transmitter from the compartment when it is being actuated have provided access holes. Others, as indicated, have attached the electronic garage door opener transmitter to the ceiling of the compartment, and secured an actuator element to the door of the compartment. Displacement of the door will cause actuation of the electronic garage door opener transmitter. Of course, the electronic garage door opener transmitter is then subject to being dropped when the door is opened.

SUMMARY OF THE INVENTION

The foregoing and other deficiencies in the prior art are overcome by the present invention which provides an overhead compartment for the interior of a vehicle for accommodating an actuatable transmitter of the type having an actuation region. In accordance with the invention, a first housing portion defines a volume of a compartment. The compartment is provided with a roof and first and second ends distal from one another. The compartment additionally has a compartment opening for receiving the actuatable transmitter. A compartment door pivotally attached at a first end thereof to the first housing portion in the vicinity of the first end thereof is pivotally displaceable between open and closed positions wherein the compartment opening is respectively opened and closed. The compartment door, when in the closed position, forms a floor of the volume of the compartment. A second housing portion is arranged to extend away from the second end of the compartment, the second housing portion being formed integrally with the first housing portion. In addition, a resilient latch that is integrally formed with the compartment door at a second end thereof distal from the first end thereof, is provided. The resilient latch is arranged to communicate latchingly with the second housing portion, whereby the compartment door is pivotally displaceable with respect to the second housing portion beyond a predetermined minimum pivotal displacement required to effect a latch with the second housing portion. When the compartment door is pivotally displaced with respect to the second housing portion beyond the predetermined minimum pivotal displacement required to effect a latched condition with the second housing portion, an actuator communicates with the actuation region of the actuatable transmitter. First and second installation coupling arrangements couple the overhead compartment to the interior of the vehicle. The first installation coupling arrangement is integrally formed with the first housing portion, and the second installation coupling arrangement being integrally formed with the second housing portion.

In one embodiment of the invention, the second housing portion is provided with an aperture therethrough for accommodating an accessory switch. In a further embodiment, the second housing portion is provided with a lighting enclosure for accommodating a lamp.

A releasable coupler may be provided for releasably coupling the actuatable transmitter to an interior surface of the compartment door. The releasable coupler may be a hook-and-loop fastener. I such an embodiment, the actuator is coupled to the roof of the first housing portion at a selected one of a plurality of roof coupling locations. The selected roof coupling location is determined in response to the location of the actuation region of the actuatable transmitter. Preferably, the actuator is configured to provide a predetermined plurality of selectable span lengths between the roof of the first housing portion and the actuation region of the actuatable transmitter.

In a further embodiment, there is provided a hinge for coupling the compartment door pivotably to the first housing portion. Additionally, there is provided a pivot stop for limiting the maximum pivotal displacement of the compartment door in the direction of opening the compartment opening.

In accordance with a further apparatus aspect of the invention, an overhead compartment for the interior of a vehicle is provided for accommodating an actuatable transmitter of the type having an actuation region. In accordance with the invention, a first housing portion defines a volume of a compartment, the compartment having a roof and first and second ends distal from one another. In addition, the compartment has a compartment opening for receiving the actuatable transmitter. A compartment door is pivotally attached at a first end there of to the first housing portion in the vicinity of the first end thereof The compartment door is pivotally displaceable between open and closed positions wherein the compartment opening is respectively opened and closed. The compartment door, when in the closed position, forms a floor of the volume of the compartment. A second housing portion is arranged to extend away from the second end of the compartment, the second housing portion being formed integrally with the first housing portion. A resilient latch that is integrally formed with the compartment door at a second end there of distal from the first end thereof, is arranged to communicate latchingly with the second housing portion. In this manner, the compartment door is pivotally displaceable with respect to the second housing portion beyond a predetermined minimum pivotal displacement required to effect a latch with the second housing portion. There is additionally provided an actuator for communicating with the actuation region of the actuatable transmitter when the compartment door is pivotally displaced with respect to the second housing portion beyond the predetermined minimum pivotal displacement required to effect a latched condition with the second housing portion. The actuator is coupled to the roof of the first housing portion at a selected one of a plurality of roof coupling locations, the selected roof coupling location being determined in response to the location of the actuation region of the actuatable transmitter. A releasable coupler is provided for releasably coupling the actuatable transmitter to an interior surface of the compartment door.

In one embodiment of the invention, there are further provided first and second installation coupling arrangements for coupling the overhead compartment to the interior of the vehicle. The first installation coupling arrangement is integrally formed with the first housing portion, and the second installation coupling arrangement being integrally formed with the second housing portion.

A hinge is provided for coupling the compartment door pivotably to the first housing portion, and there is further provided a pivot stop for limiting the maximum pivotal displacement of the compartment door in the direction of opening the compartment opening.

Preferably, the actuator is configured to provide a predetermined plurality of selectable span lengths between the roof of the first housing portion and the actuation region of the actuatable transmitter. In a further embodiment, the releasable coupler incorporates a hook-and-loop fastener.

In accordance with yet another apparatus aspect of the invention, an overhead compartment for the interior of a vehicle is arranged to accommodate an actuatable transmitter of the type having an actuation region. In accordance with the invention, a housing is provided for defining a volume of a compartment, the compartment having a roof and first and second ends distal from one another. The compartment additionally has a compartment opening for receiving the actuatable transmitter. A compartment door is pivotally attached at a first end thereof to the housing in the vicinity of the first end thereof The compartment door is pivotally displaced between open and closed positions wherein the compartment opening is respectively opened and closed. When in the closed position, the compartment door forms a floor of the volume of the compartment. A resilient latch is formed integrally with the compartment door, and is disposed at a second end thereof distal from the first end thereof An actuator communicates with the actuation region of the actuatable transmitter when the compartment door is pivotally displaced beyond the predetermined minimum pivotal displacement required to effect a latched condition, the actuator being coupled to the roof of the housing at a selected one of a plurality of roof coupling locations, the selected roof coupling location being determined in response to the location of the actuation region of the actuatable transmitter, the actuator being configured to provide a predetermined plurality of selectable span lengths between the roof of the housing and the actuation region of the actuatable transmitter. In addition, a releasable coupler releasably couples the actuatable transmitter to an interior surface of the compartment door.

In one embodiment of this further aspect of the invention, there is further provided a further housing portion that is arranged to extend away from the second end of the compartment. The further housing portion is formed integrally with the housing.

The resilient latch is arranged to communicate latchingly with the further housing portion. In this manner, the compartment door is pivotally displaceable with respect to the further housing portion beyond a predetermined minimum pivotal displacement required to effect a latch with the further housing portion.

The releasable coupler may be, in certain embodiments of the invention, a hook-and-loop fastener.

BRIEF DESCRIPTION OF THE DRAWING

Comprehension of the invention is facilitated by reading the following detailed description, in conjunction with the annexed drawing, in which.

DETAILED DESCRIPTION

Figure 1:
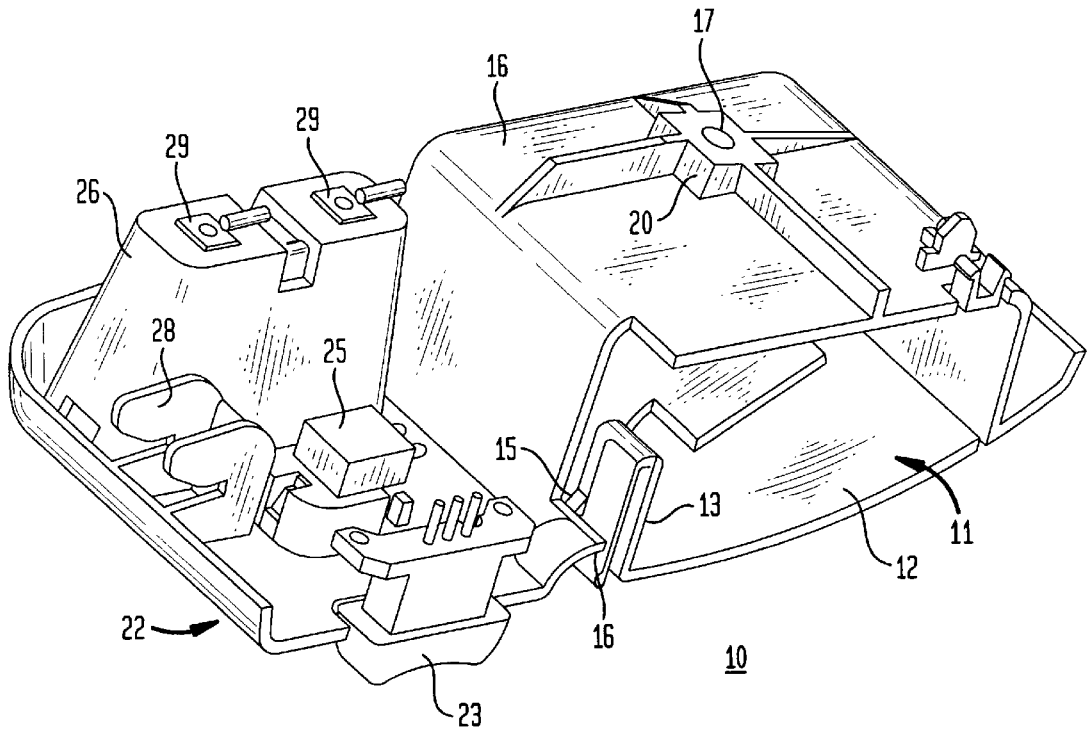
FIG. 1 is an isometric cross-sectional and fragmented representation of a specific illustrative embodiment of the invention showing the universal garage door opener compartment and associated structure.

FIG. 1 is an isometric cross-sectional and fragmented representation of a specific illustrative embodiment of the invention. As shown, a universal garage door opener arrangement 10 has a universal garage door opener compartment 11 defined by a compartment door 12 which is hinged (not shown in this figure) at one end. This figures, as well as the remaining figures herein, shows only one half of a symmetrical embodiment of the invention in order to facilitate comprehension of the invention. The compartment door is provided with a resilient latching arrangement 13 that is formed to have a generally U-shaped configuration. On an outer surface of resilient latching arrangement is provided a latching protuberance 15 that latches against an edge portion 16 of the universal garage door opener arrangement.

Universal garage door opener arrangement 10 has a housing 16 that is provided with means for installation as an overhead console in a motor vehicle (not shown). Such installation means, in this specific illustrative embodiment of the invention, takes the form of a mounting aperture 17 that is shown in this embodiment to be arranged through a reinforced portion 20 of the housing.

In this specific illustrative embodiment of the invention, the housing is integrally formed with a console portion 22 that has incorporated therewith a plurality of switches for effecting various vehicle functions that are not necessarily functionally related to the universal garage door opener compartment. For example, a three-position switch 23 can be used to operate accessories, such as a sunroof (not shown) of the vehicle. A further switch 25 can be used to operate lighting equipment in the vehicle, such as a lamp (not shown) that would be enclosed within lighting enclosure 26. As shown in this figure, and in FIG. 3, universal garage door opener compartment 11 and compartment door 12 form a continuous contour with console portion 22.

Figure 2:
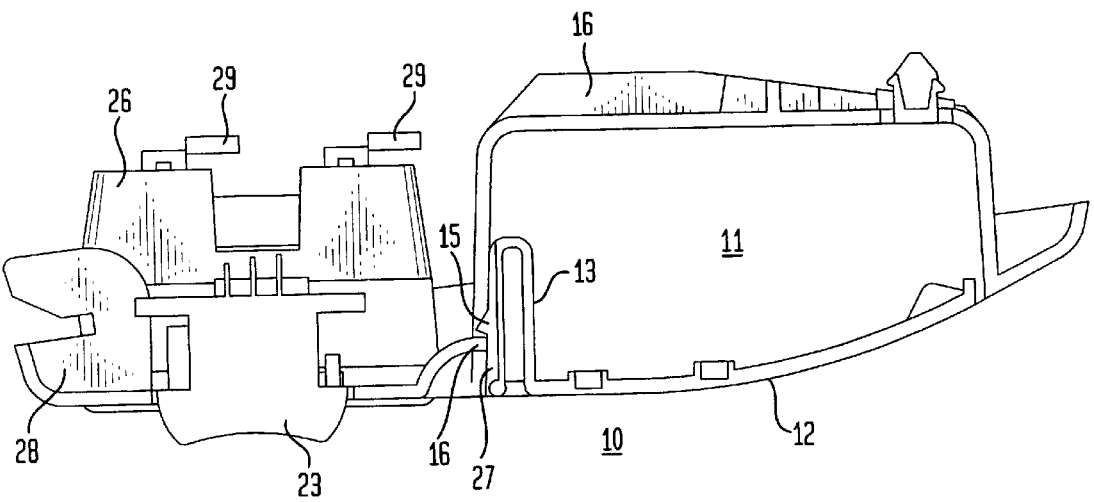
FIG. 2 is a cross-sectional plan representation of the embodiment of FIG. 1.

FIG. 2 is a cross-sectional plan representation of the embodiment of FIG. 1. Elements of structure that bear analogous correspondence to those described previously are similarly designated. As shown in FIG. 2, latching protuberance 15, which is shown in a latched closed condition, is resiliently biased against edge portion 16. There is additionally provided a surface 27 that is sloped in relation to the edge portion so as to permit a degree of freedom in urging compartment door 12 inward, toward the interior of the compartment, to effect actuation of the garage door opener therein (not shown), as will be described below.

FIGS. 1 and 2 show a coupling arrangement 28 for facilitating mounting of the universal garage door opener arrangement as an overhead console. In addition, both of the figures show electrical terminals 29 on lighting enclosure 26 for facilitating delivery of electrical energy to the lamp (not shown) enclosed within the lighting enclosure. In one embodiment, electrical terminals 29 are coupled electrically via wire (not shown) to the terminals of switch 25.

Figure 3:
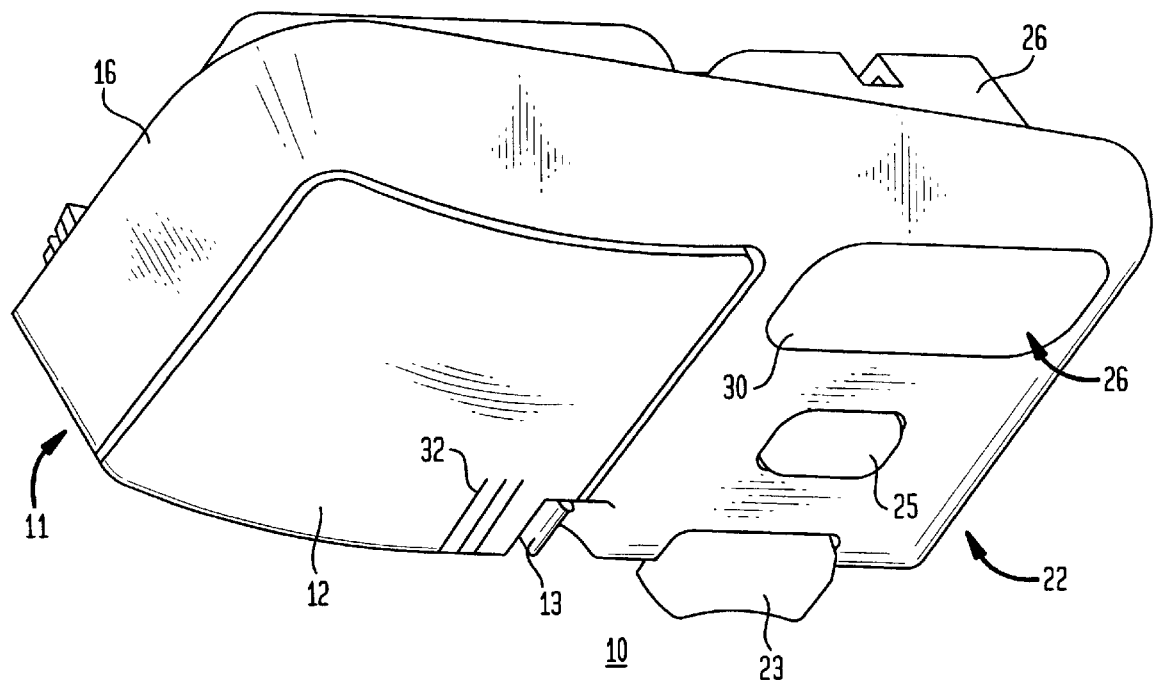
FIG. 3 is an isometric fragmented representation of the embodiment of FIG. 1 showing the region accessible to an operator of a vehicle (not shown)

FIG. 3 is an isometric fragmented representation of the embodiment of FIG. 1 showing the region accessible to an operator (not shown) of a vehicle (not shown). Elements of structure that bear analogous correspondence to those described previously are similarly designated. As shown in FIG. 3, universal garage door opener compartment 11 and compartment door 12 form a continuous, aesthetically pleasing contour with console portion 22. The door opener compartment, in this specific illustrative embodiment of the invention, constitutes a first housing portion that is integrally formed with console portion 22, which forms a second housing portion. Switches 23 and 25 protrude through respective openings in housing 16. Similarly, the interior of lighting enclosure 26 is accessible from this side, and may be covered with a lens 30 to control the output light (not shown) of the lamp (not shown). A terminal edge of resilient latching arrangement 13 is accessible on this side of universal garage door opener arrangement 10. An operator of the arrangement can apply a disengagement force to the accessible portion of the resilient latching arrangement in the direction toward the compartment door, to effect disengagement of latching protuberance 15 (not shown in this figure) from edge portion 16 (not shown in this figure). There is additionally shown in this figure a plurality of engravings, or protuberances, 32 that assist the operator (not shown) to locate the appropriate location where an actuation pressure is to be applied to actuate the operation of the garage door opener (not shown) contained within the compartment.

Figure 4:
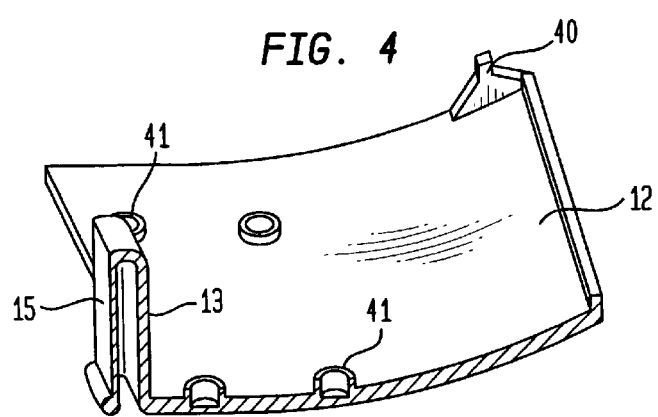
FIG. 4 is an isometric cross-sectional representation of a compartment door for the embodiment of FIG. 1.

FIG. 4 is an isometric cross-sectional representation of compartment door 12 for the universal garage door opener arrangement 10 of FIG. 1 showing the interior surface of the compartment door. As shown, the interior surface of the compartment door is provided with a plurality of reinforced apertures 41 for accommodating selectable ones of actuation elements 50 shown in FIG. 5.

Figure 5:
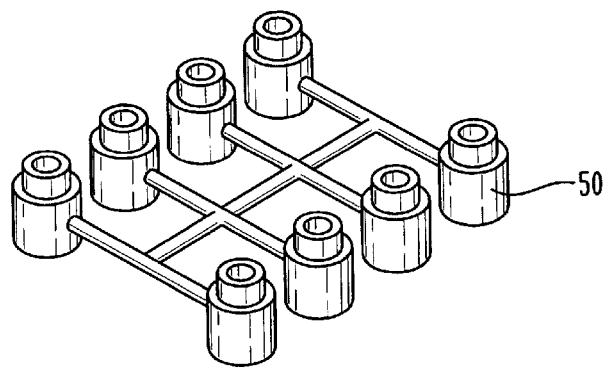
FIG. 5 is an isometric representation of a plurality of simultaneously molded actuation elements for installation on the compartment door of FIG. 4.

FIG. 5 is an isometric representation of a plurality of simultaneously molded actuation elements 50 for installation on compartment door 12 of FIG. 4. As shown in this figure, a plurality of actuation elements are simultaneously molded, such as by injection molded process, and have different longitudinal dimensions. When the garage door opener is enclosed within the compartment, selected ones of the actuation elements are installed in selected ones of reinforced apertures 41, whereby the actuation elements coincide with the actuation region (not shown) of the garage door opener (not shown) to effect actuation thereof In this specific illustrative embodiment of the invention the actuation elements are also installable axially into one another to achieve a desired length, that would depend upon the dimensions of the specific garage door opener being used.

Figure 6:
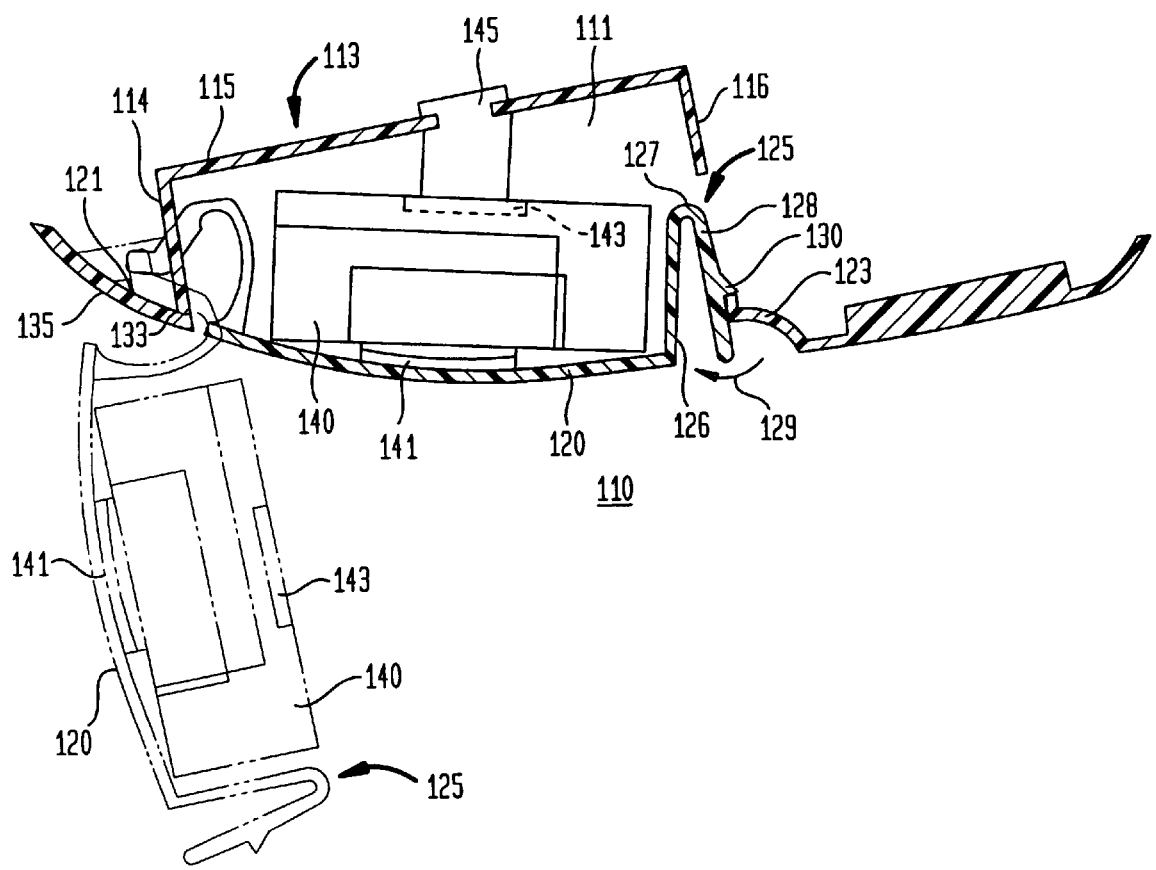
FIG. 6 is a simplified partially cross-sectional schematic side representation of a specific illustrative embodiment of the invention showing a garage door opener transmitter compartment and showing the garage door transmitter installed on a door of the compartment.

FIG. 6 is a partially cross-sectional representation of another embodiment of a garage door opener transmitter compartment 110 constructed in accordance with the principles of the invention. Garage door opener transmitter compartment 110 is provided with a compartment of volume 111 that is defined substantially by a housing that is generally designated as 113 having a first side 114, a roof 115, and a second side 116. Compartment volume 111 is further defined by a door 120 that is pivotally coupled to a support 121 at one end thereof and is releasably coupled to a console housing portion 123 by a resilient latch arrangement 125 that in this specific embodiment of the invention is integrally formed with door 120 at an end thereof that is distal from the hinge portion.

Resilient latch arrangement 125 is formed of a first portion 126 that extends upwardly from door 120 and is formed integrally with a resilient portion 127 that permits a latching portion 128 to be displaceable in the direction of arcuate arrow 129.

Latching portion 128 is provided with a sloping protuberance 130 that is shown to have a substantially triangular configuration. During closure of door 120, the console housing portion 123 communicates with the ramp portion of sloping protuberance 130, causing latching portion 128 to be urged and displaced in the direction of arcuate arrow 129. Ultimately, latching is set by operation of resilient portion 127 which urges sloping protuberance 130 to assume the latched position as shown in the figure.

As stated, on the other side of door 120 from resilient latch arrangement 125 is disposed a hinge element 132 that, as previously stated, is pivotally coupled to hinge support 121. Hinge element 132, as will be described herein below, has a stop surface 133 that will limit the extent to which door 120 can be opened.

As shown in phantom in FIG. 6, door 120 is openable until the stop surface 133 communicates with the interior surface of a housing wall 135.

FIG. 6 additionally shows an electronic garage door transmitter 140 that is coupled to door 120 by an adhesive element 141, which functions as a releasable coupler. In one embodiment, adhesive element 141 is formed of mating hook and loop fasteners, such as velcro hook and loop fastener wherein, respective elements thereof are coupled to the door and the electronic garage door transmitter. The electronic garage door transmitter is provided with an actuation switch 143 which, when actuated, activates the electronic transmitter circuitry (not shown) contained within electronic garage door transmitter 140. The electronic garage door transmitter is fixed by adhesive element 141 to door 120 in such a manner that actuator switch 143 is disposed directly beneath an actuator 145 that is shown to be coupled to roof 115 of housing 113. Actuator element 145 is translatable with respect to roof 115 so as to insure that it is aligned in registration with actuator switch 143.

Figure 7:
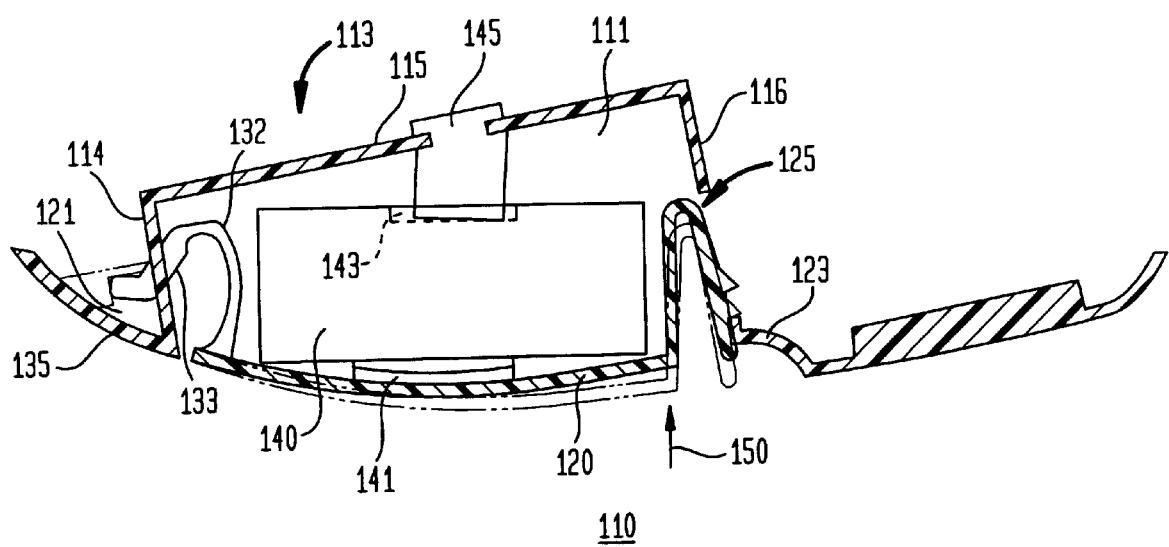
FIG. 7 is a simplified partially cross-sectional schematic side representation of the garage door opener transmitter compartment of FIG. 6, showing the manner in which the compartment door is displaced to effect actuation of the garage door opener transmitter.

FIG. 7 is a partially cross-sectional representation of the embodiment of FIG. 6. As shown in this figure, door 120 is shown in two positions. First, the position shown in dashed lines corresponds to the latched position, as shown in solidan upward force however, the operator (not shown) can apply an upward force to the door in the direction of arrow 150, whereupon door 120 is displaced upward to the position shown in solid line in FIG. 7. Upon being thus displaced, electronic garage door transmitter 140 is urged upward toward roof 115 of housing 113, such that actuator 145 engages with actuator switch 143 and urges same into the electronic garage door transmitter. As previously stated, such depression of actuator switch 143 will activate the internal circuitry (not shown) of the electronic garage door transmitter.

It is evident from FIG. 7 that electronic garage door transmitter 140 can be activated without requiring to be accessed directly by the operator (not shown). There is no need to form an aperture through door 120 to permit the operator to communicate directly with the electronic garage door transmitter.

It is another advantage of this invention that, particularly as shown in FIG. 6, the electronic garage door transmitter is affixed to door 120 and even when the door is open, and should adhesive element 141 become loosened, the electronic garage door transmitter will not fall out of garage door opener transmitter compartment 110. More specifically, when garage door 120 is opened, the falling out of the electronic garage door transmitter is precluded by resilient latch arrangement 125. This provides an advantage over arrangements that fix the electronic garage door transmitter to the inside of roof 115, whereby the electronic garage door transmitter will fall out of the compartment should adhesive element 141 become disengaged while door 120 is open.

Figure 8:
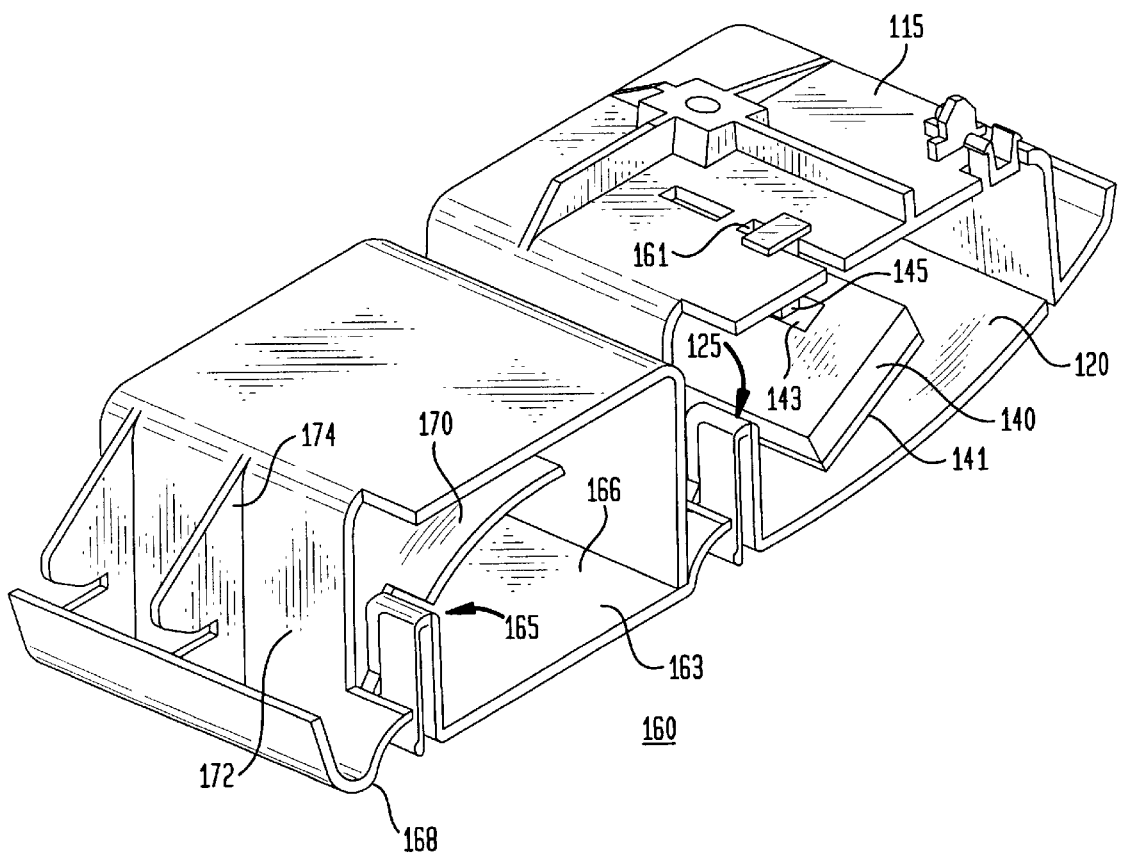
FIG. 8 is a fragmented isometric representation of a specific embodiment of the invention showing an overhead console arrangement for a vehicle.

FIG. 8 is a fragmented isometric representation of a specific embodiment of the invention showing an overhead console arrangement 160 for a vehicle (not shown). Elements of structure that correspond to those previously discussed are similarly designated. In the embodiment of FIG. 8, roof 115 is shown to have an elongated aperture 161 therethrough for accommodating actuator 145. The actuator, therefore, can be positioned anywhere along elongated aperture 161, whereby the actuator can be positioned to insure registration with actuator switch 143 of electronic garage door transmitter 140.

In this embodiment of the invention, there is additionally shown a further compartment 163 that, in this embodiment, is configured to store eye glasses or sunglasses. Compartment 163 is provided with a resilient latching arrangement 165 whereby door 166 is latched to housing portion 168. Door 166 is provided with a curved panel 170 that prevents the sunglasses (not shown) from falling out of the compartment when the door is opened.

Wall 172 of compartment 163 is provided with a plurality of slotted tabs 174 that facilitate mounting and installation of the overhead console arrangement.

Figure 9:
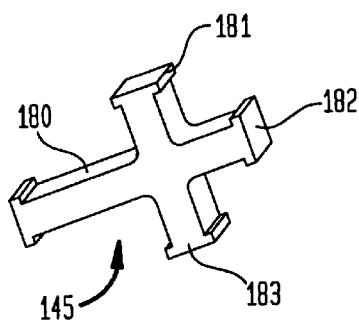
FIG. 9 is an isometric representation of an actuator 45 that is suitable for incorporation into the embodiment of FIG. 8.

FIG. 9 is an isometric representation of an actuator 145 that is suitable for inclusion in the embodiment of FIG. 8.

FIG. 9 shows actuator 145 having four extensions 180, 181, 182, and 183, each being of a slightly different length. Thus, actuator 145 can be installed within elongated aperture 161 so as to cover a variety of distances between roof 115 and actuator switch 143. Actuator 145 is formed of an elastomeric material and can be cut by the operator at any desired length. The placement of actuator 145 along elongated aperture 161, and the potential to place electronic garage door transmitter 140 at a variety of locations on door 120 permits the garage door opener transmitter compartment to accommodate a large variety of different sizes and configurations of electronic garage door transmitters.

Although the invention has been described in terms of specific embodiments and applications, persons skilled in the art can, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof

What is claimed is:

1. An overhead compartment for the interior of a vehicle for accommodating a transmitter of the type having an actuation region, the overhead compartment comprising:

a first housing portion for defining a volume of the overhead compartment, the overhead compartment having a roof and first and second ends distal from one another, the overhead compartment further having a compartment opening for receiving the transmitter;

a compartment door pivotally attached at a first end thereof to said first housing portion in the vicinity of the first end of the overhead compartment, said compartment door being pivotally displaceable between open and closed positions wherein the compartment opening is respectively opened and closed, said compartment door, when in the closed position, forming a floor of the volume of the overhead compartment;

a second housing portion arranged to extend away from the second end of the overhead compartment, said second housing portion being formed integrally with said first housing portion;

a resilient latch integrally formed with said compartment door at a second end thereof distal from the first end thereof, said resilient latch being arranged to communicate latchingly with said second housing portion, whereby said compartment door is pivotally displaceable with respect to said second housing portion beyond a predetermined minimum pivotal displacement required to effect a latch with said second housing portion;

an actuator for communicating with the actuation region of the transmitter when said compartment door is pivotally displaced with respect to said second housing portion beyond the predetermined minimum pivotal displacement required to effect a latched condition with said second housing portion; and first and second installation coupling a fragments for coupling the overhead compartment to the interior of the vehicle, said first installation coupling arrangement being integrally formed with said first housing portion, and said second installation coupling arrangement being integrally formed with said second housing portion.

2. The overhead compartment of claim 1, wherein said second housing portion is provided with an aperture therethrough for accommodating an accessory switch.

3. The overhead compartment of claim 1, wherein said second housing portion is provided with a lighting enclosure for accommodating a lamp.

4. The overhead compartment of claim 1, wherein there is further provided a releasable coupler for releasably coupling the transmitter to an interior surface of the compartment door.

5. The overhead compartment of claim 4, wherein said releasable coupler comprises a hook-and-loop fastener.

6. The overhead compartment of claim 4, wherein said actuator is coupled to the roof of the first housing portion.

7. The overhead compartment of claim 6, wherein said actuator is coupled to the roof of the first housing portion at a selected one of a plurality of roof coupling locations, the selected roof coupling location being determined in response to the location of the actuation region of the transmitter.

8. The overhead compartment of claim 4, wherein said actuator is configured to provide a predetermined plurality of selectable span lengths between the roof of the first housing portion and the actuation region of the transmitter.

9. The overhead compartment of claim 1, wherein there is further provided a hinge for coupling said compartment door pivotably to said first housing portion, and there is further provided a pivot stop for limiting the maximum pivotal displacement of said compartment door in the direction of opening the compartment opening.

10. An overhead compartment for the interior of a vehicle for accommodating a transmitter of the type having an actuation region, the overhead compartment comprising:

a first housing portion for defining a volume of the overhead compartment, overhead compartment having a roof and first and second ends distal from one another, the overhead compartment having a compartment opening for receiving the transmitter;

a compartment door pivotally attached at a first end thereof to said first housing portion in the vicinity of the first end thereof, said compartment door being pivotally displaceable between open and closed positions wherein the compartment opening is respectively opened and closed, said compartment door, when in the closed position, forming a floor of the volume of the overhead compartment;

a second housing portion arranged to extend away from the second end of the overhead compartment, said second housing portion being formed integrally with said first housing portion;

a resilient latch integrally formed with said compartment door at a second end thereof distal from the first end thereof, said resilient latch being arranged to communicate latchingly with said second housing portion, whereby said compartment door is pivotally displaceable with respect to said second housing portion beyond a predetermined minimum pivotal displacement required to effect a latch with said second housing portion;

an actuator for communicating with the actuation region of the transmitter when said compartment door is pivotally displaced with respect to said second housing portion beyond the predetermined minimum pivotal displacement required to effect a latched condition with said second housing portion, said actuator being coupled to the roof of the first housing portion at a selected one of a plurality of roof coupling locations, the selected roof coupling location being determined in response to the location of the actuation region of the transmitter; and a releasable coupler for releasably coupling the transmitter to an interior surface of the compartment door.

11. The overhead compartment of claim 10, wherein there are further provided first and second installation coupling arrangements for coupling the overhead compartment to the interior of the vehicle, said first installation coupling arrangement being integrally formed with said first housing portion, and said second installation coupling arrangement being integrally formed with said second housing portion.

12. The overhead compartment of claim 10, wherein there is further provided a hinge for coupling said compartment door pivotably to said first housing portion, and there is further provided a pivot stop for limiting the maximum pivotal displacement of said compartment door in the direction of opening the compartment opening.

13. The overhead compartment of claim 10, wherein said actuator is configured to provide a predetermined plurality of selectable span lengths between the roof of the first housing portion and the actuation region of the transmitter, selectable span lengths between the roof of the housing and the actuation region of the transmitter; and a releasable coupler for releasably coupling the transmitter to an interior surface of the compartment door.

14. The overhead compartment of claim 10, wherein said releasable coupler comprises a hook-and-loop fastener.

15. An overhead compartment for the interior of a vehicle for accommodating a transmitter of the type having an actuation region, the overhead compartment comprising:

a housing for defining a volume of the overhead compartment, the overhead compartment having a roof and first and second ends distal from one another, the overhead compartment having a compartment opening for receiving the transmitter;

a compartment door pivotally attached at a first end thereof to said housing in the vicinity of the first end the roof, said compartment door being pivotally displaceable between open and closed positions wherein the compartment opening is respectively opened and closed, said compartment door, when in the closed position, forming a floor of the volume of the overhead compartment;

a resilient latch integrally formed with said compartment door at a second end thereof distal from the first end thereof, an actuator for communicating with the actuation region of the transmitter when said compartment door is pivotally displaced beyond a predetermined minimum pivotal displacement required to effect a latched condition, said actuator being coupled to the roof of the housing at a selected one of a plurality of roof coupling locations, the selected roof coupling location being determined in response to the location of the actuation region of the transmitter, said actuator being configured to provide a predetermined plurality of selectable span lengths between the roof of the housing and the actuation region of the transmitter; and a releasable coupler for releasably coupling the transmitter to an interior surface of the compartment door.

16. The overhead compartment of claim 15, wherein there is further provided a further housing portion arranged to extend away from the second end of the overhead compartment.

17. The overhead compartment of claim 16, wherein said further housing portion is formed integrally with said housing.

18. The overhead compartment of claim 16, wherein said resilient latch is arranged to communicate latchingly with said further housing portion, whereby said compartment door is pivotally displaceable with respect to said further housing portion beyond a predetermined minimum pivotaldisplacement required to effect a latch with said further housing portion.

19. The overhead compartment of claim 15, wherein said releasable coupler comprises a hook-and-loop fastener.

* * * * *